United States Patent

[11] 3,571,749

[72] Inventor Jack A. Soules
 Cleveland, Ohio
[21] Appl. No. 773,453
[22] Filed Nov. 5, 1968
[45] Patented Mar. 23, 1971
[73] Assignee The United States of America as represented by the Secretary of the Navy

[54] DUST COOLED GAS LASER
 4 Claims, 2 Drawing Figs.
[52] U.S. Cl. ................................................. 331/94.5
[51] Int. Cl. .................................................. H01s 3/22, H01s 3/09, H01s 3/04
[50] Field of Search .................................... 331/94.5

[56] References Cited
 UNITED STATES PATENTS
 3,484,720  12/1969  Waltetc ...................... 331/94.5

OTHER REFERENCES

Gould, " Collision Lasers" in " Applied Optics Supplement On Chemical Lasers," April 1965, pp. 59— 67

Howe, " Effect of Foreign Gases on the $CO_2$ Laser: R-Branch Transitions," app. Phys. Lett. 7(1), 1 July 1965 pp. 21— 22

Rawson et al. " Propulsion and Angular Stabilization of Dust Particles in a Laser Cavity," app. Phys. Lasers 8,(4), 15 Feb. 1966, pp. 93— 95

Primary Examiner—Ronald L. Wibert
Assistant Examiner—R. J. Webster
Attorneys—R. S. Sciascia, M. L. Crane and A. L. Branning ABSTRACT: A gas laser in which microscopic particles are circulated within the laser tube in order to cool the laser by conducting the heat to the walls of the laser element.

PATENTED MAR 23 1971 3,571,749

INVENTOR
JACK A. SOULES

BY *Melvin L. Crane* AGENT

*R. K. Ciancia* ATTORNEY

DUST COOLED GAS LASER

The invention described herein may be manufactured and used by or for the Government of the United States of America for governmental purposes without the payment of any royalties thereon or therefor.

BACKGROUND OF THE INVENTION

Heretofore many different types of gas lasers have been developed for various applications such as welding, cutting, drilling, and application to communications. Such lasers including He–Ne and $CO_2$ lasers are limited in power output by the energy which accumulates in the lower lasing state. This energy must be removed by conduction to the walls, or, in some cases, the gas within the laser tube can be circulated and fresh gas provided to maintain the lasing action. In order to remove energy from the lower state a common practice has been to add helium gas to the gaseous mixtures used. This additional gas within the mixture brings about thermal conduction to the walls of the laser tube. Lowering of the thermal conditions within the laser chamber improves the power output.

SUMMARY OF THE INVENTION

This invention makes use of any well-known wall cooled gas-type laser into which dust particles having a diameter of about 250 Angstrom unit and a density near 1 gm./cm.$^3$ are added. These particles may be circulated with the circulating lasing gas or added into the gas of a laser element which is not provided with a circulating gas. The dust particles are heated by the lasing gas and are cooled upon contact with the walls by movement to the walls of the element thereby cooling the lasing gas. Thus, the energy that accumulates in the lower lasing state is removed from the laser element by the added dust particles without seriously interfering with the propagation of laser light.

It is therefore an object of the present invention to provide a system or means by which the power output of a laser may be improved.

Another object is to provide a simple and unobvious means of removing energy from the lower lasing state of a gas-type laser.

Yet another object is to provide means by which a gas laser may be cooled by efficient depumping of the lower laser state without limiting the diameter of the active region of the laser element.

Still another object is to improve the efficiency of a gas laser.

Other objects and advantages of the invention will hereinafter become more fully apparent from the following description of the annexed drawing in which, FIG. 1 illustrates a gas laser element with dust particles within the chamber, and FIG. 2 illustrates a gas laser with dust particles therein and includes a gas circulator system.

DESCRIPTION OF THE EMBODIMENTS

Figure 1:
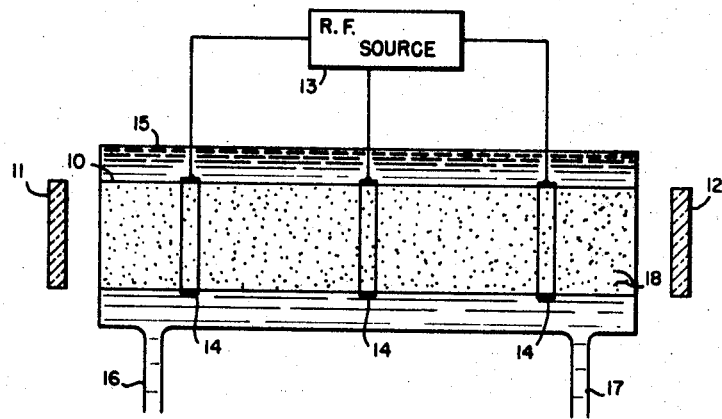

Now referring to the drawing, there is shown by illustration in FIG. 1 a well-known gas laser element which includes the usual cylindrical tube or chamber 10 with a fully reflective mirror 11 at one end and a partially reflective mirror 12 at the opposite end. The chamber is provided with the usual RF exciter source 13 secured to ring electrodes 14. The chamber may be provided with a coolant jacket 15 through which a coolant may be transmitted through inlet 16 and outlet 17 for cooling the gaseous filling therein. The gaseous filling may be any of the well known gases He–Ne$_2$, etc. or mixtures thereof.

Added into the gaseous filling is a supply of dust particles 18 which are contained throughout the entire chamber. It has been determined that a suitable dust comprises submicroscopic particles having a diameter of about 250 Angstrom units in which the density throughout the gas in the tube is about 1 milligram/cm.$^3$ Such particles correspond to large molecules or polymers of molecular weight of about five million, or they may be submicroscopic polyethylene particles. The dust particles are added into the chamber along with the gas, and the particles will exist throughout the volume of the chamber, the same as the gaseous filling. It has been determined that these dust particles do not seriously interfere with the propagation of laser light due to optical scattering. For better movement of the dust particles within the chamber, normal thermal agitation or a vibration may be applied to sufficiently stir the dust particles to circulate the dust particles between the cold walls and within the hot gas.

Figure 2:
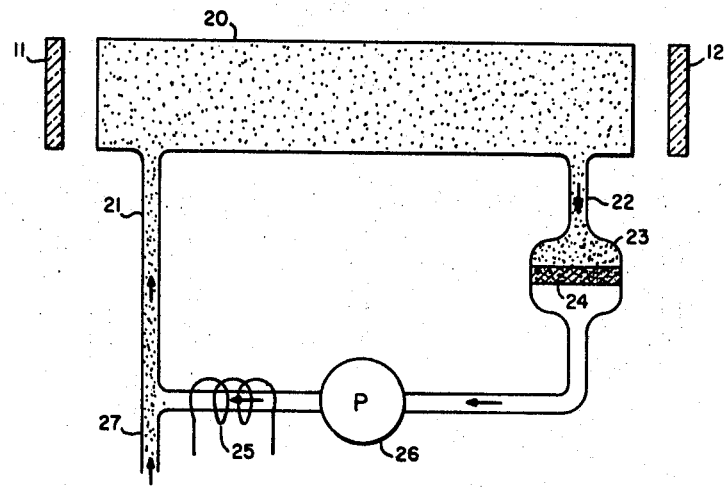

FIG. 2 is directed to a well-known modification wherein the operating gas is circulated through the laser chamber 20 in order to cool the gas. As shown, the laser chamber is provided with an inlet 21 and an outlet 22. The line from the outlet is directed to a filter chamber 23 in which filter 24 filters the hot dust particles out of the laser gas which is cooled at 25 by well-known principles and pumped back into the laser chamber by a circulating pump 26 through inlet 21. As shown, the inlet line is provided with a connector line 27 through which cold dust particles are added to the cooled laser gas that is pumped into the laser chamber. The rate of flow of the laser gas is well known in the art and the dust particles are mixed with the circulating laser gas so that the density of dust particles is about 1 milligram/cm.$^3$ as described above.

The operation of the laser elements of FIGS. 1 and 2 are well known in the art and it is believed not to be necessary to describe the operation thereof. The new and added feature of this invention is the addition of submicroscopic particles to the gases normally used in the laser element in order to aid in cooling the gases during operation of the laser. The gas particles move about within the chamber due to molecular scattering and on striking the walls of the chamber loose their heat to the wall which is normally cooled by some means. It has been determined that the optical scattering of the dust particles do not interfere with the propagation of laser light but aid in the overall operation of the laser due to its cooling effect. Cooling the gas within the laser offers the advantage of efficient depumping of the lower laser state without limiting the diameter of the active region of the laser. Thus, energy is removed from the lower lasing state by the addition of submicroscopic particles in the gas within the chamber. In the gaseous laser in which the gas is pumped through the chamber the dust particles will be circulated with the gas collecting the heat as the particles are moved through the chamber. In the device shown in FIG. 2, the dust particles passing through the chamber are collected by the filter and fresh dust particles are fed into the chamber through the gas inlet into the chamber along with the fresh gas supply.

Obviously many modifications and variations of the present invention are possible in the light of the above teachings. It is therefore to be understood that within the scope of the appended claims the invention may be practiced otherwise than as specifically described.

I claim:

1. In an improved gas-type laser system including a gaseous filling within a closed chamber, the improvement including, small particles of solid matter dispersed uniformly within said gaseous filling, whereby collisions of said small particles of solid matter absorb heat from said gaseous filling to aid in cooling said laser system by conducting heat to the walls of said chamber.

2. In a gas-type laser system as claimed in claim 1; in which, said particles of solid matter are mixed within the gaseous filling at a density of about 1 milligram/cm.$^3$.

3. In an improved gas-type laser system as claimed in claim 2; in which, said particles of solid matter have a diameter of about 250 Angstroms.

4. In an improved gas-type laser system as claimed in claim 2; which includes:

means for circulating said gaseous filling through said closed chamber;

filter means for filtering said particles of matter from the gaseous filling upon leaving the chamber; and means for adding particles of matter into said gaseous filling pumped into the chamber.